US012026998B2

(12) United States Patent
Robillard et al.

(10) Patent No.: US 12,026,998 B2
(45) Date of Patent: Jul. 2, 2024

(54) ELECTRONIC DOOR LOCK

(71) Applicant: Janus International Group, LLC, Temple, GA (US)

(72) Inventors: Scott Robillard, Carrollton, GA (US); Yannick Funk, Dummondville (CA); Luc Duguay, Dummondville (CA)

(73) Assignee: JANUS INTERNATIONAL GROUP, LLC, Temple, GA (US)

( * ) Notice: Subject to any disclaimer, the term of this patent is extended or adjusted under 35 U.S.C. 154(b) by 317 days.

(21) Appl. No.: 17/538,193

(22) Filed: Nov. 30, 2021

(65) Prior Publication Data

US 2022/0172528 A1 Jun. 2, 2022

Related U.S. Application Data

(60) Provisional application No. 63/120,015, filed on Dec. 1, 2020.

(51) Int. Cl.
*G07C 9/00* (2020.01)
*E05B 41/00* (2006.01)
*E05B 47/00* (2006.01)

(52) U.S. Cl.
CPC .......... *G07C 9/00182* (2013.01); *E05B 41/00* (2013.01); *E05B 47/0004* (2013.01); *E05B 2047/0016* (2013.01); *E05B 2047/0069* (2013.01)

(58) Field of Classification Search
CPC ...... E05B 41/00; E05B 47/00; E05B 47/0001; E05B 47/0003; E05B 47/0004; E05B 47/0005; E05B 2047/0014; E05B 2047/0015; E05B 2047/0016; E05B 2047/0067; E05B 2047/0068; E05B 2047/0069; G07C 9/00; G07C 9/00174; G07C 9/00182
USPC ............................................................ 70/280
See application file for complete search history.

(56) References Cited

U.S. PATENT DOCUMENTS

| | | | | |
|---|---|---|---|---|
| 2014/0265359 A1* | 9/2014 | Cheng | E05B 47/00 | 292/144 |
| 2014/0319851 A1* | 10/2014 | Curtis | E05B 15/0295 | 292/215 |
| 2018/0051502 A1* | 2/2018 | Roos | E05B 81/34 | |
| 2019/0323265 A1* | 10/2019 | Robillard | E06B 3/485 | |
| 2019/0340858 A1* | 11/2019 | Ouellet | G07C 9/28 | |

FOREIGN PATENT DOCUMENTS

KR 20170098614 A * 8/2017

* cited by examiner

*Primary Examiner* — Nathan Cumar
(74) *Attorney, Agent, or Firm* — Jason A. Bernstein; Steven D. Shipe; Barnes & Thornburg LLP

(57) ABSTRACT

A door-lock system includes a door latch adapted to be coupled to one of a door or to a structure defining the passageway through which the door restricts passage. The door-lock system may further include a latch lock adapted to be coupled to the other of the door or to the structure defining the passageway to selectively mate with the door latch to block the door from opening.

18 Claims, 10 Drawing Sheets

ELECTRONIC DOOR LOCK

CROSS-REFERENCE TO RELATED APPLICATION

This patent application claims priority to U.S. Provisional Patent Application Ser. No. 63/120,015, entitled "Electronic Door Lock," filed Dec. 1, 2020, and commonly assigned to the assignee of the present application, the disclosure of which is incorporated by reference in its entirety herein.

FIELD

The present disclosure generally relates to wireless-enabled locking devices and more particularly to electronic door locks and locking systems.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
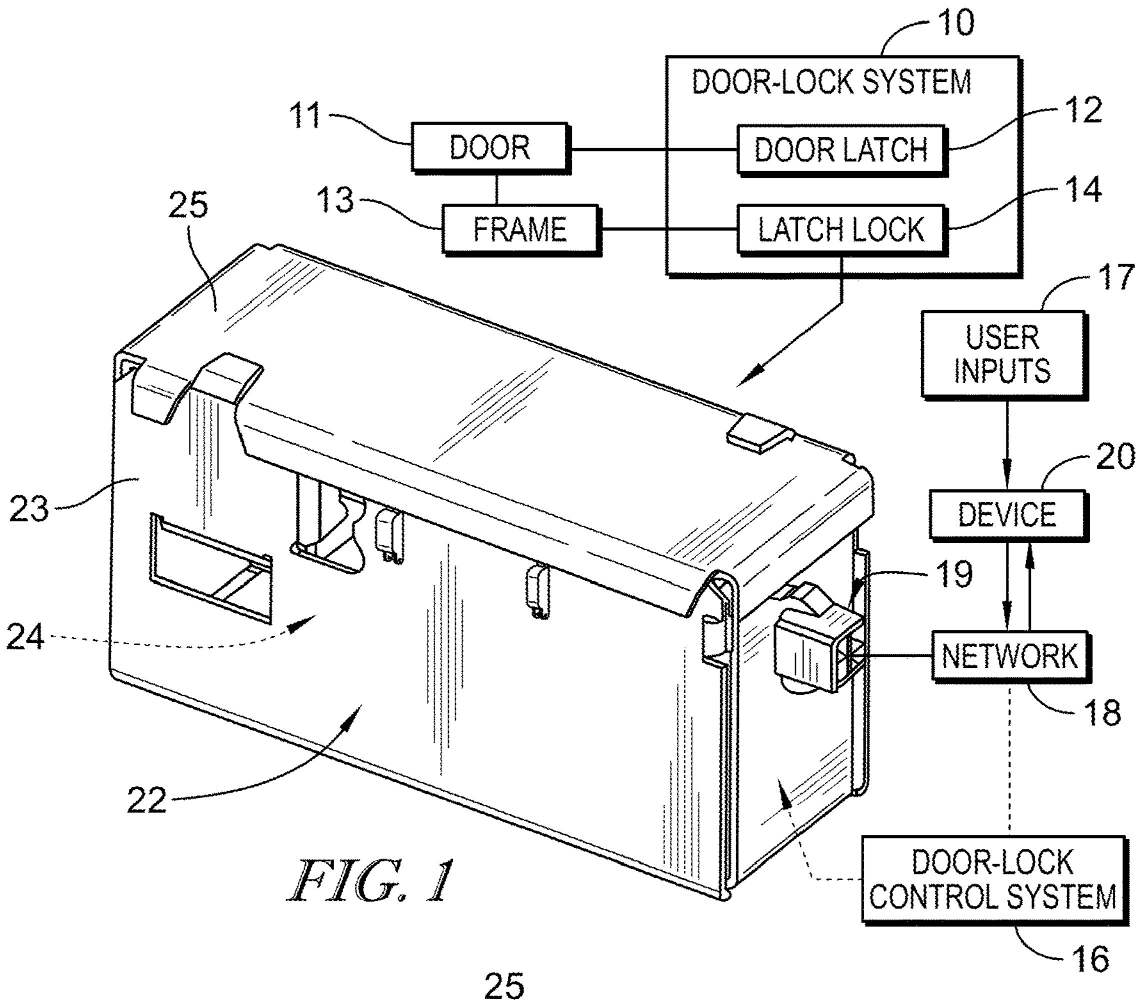
FIG. 1 is a perspective and diagrammatic view of a door-lock system, according to one exemplary embodiment.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring now to FIG. 1, an exemplary embodiment of a door-lock system 10 is shown and is configured to selectively block a door 11 from opening so that only authorized users may pass through a doorway (not shown). The door 11 may be swinging door that moves from a closed position blocking passage through the doorway and an opened position in which the door is pivoted about one or more hinges away from the doorway so that passage is allowed therethrough. Of course, the door-lock system 10 may be used with a variety of doors or gates, such as a sliding door, a panel door, a revolving door, a roll-up door, a security gate, and so on.

The door-lock system 10 includes a door latch 12 coupled to the door 11 and a latch lock 14 coupled to a frame 13 of the door 11 bordering the doorway as shown in FIG. 1. In an embodiment, the door latch 12 may be coupled to the frame 13, and the latch lock 14 may be coupled to the door 11. The door latch 12 may selectively engage with the latch lock 14 when the door 11 is in the closed position to block the door from moving to the opened position until an authorized user disengages the latch lock 14 from the door latch 12. The latch lock 14 is configured to change from an engaged configuration, in which the latch lock 14 blocks separation of the door latch 12 from the latch lock 14, to a disengaged configuration, in which the door latch 12 is free to separate from the latch lock 14 so that the door may move to the opened position.

Figure 13:
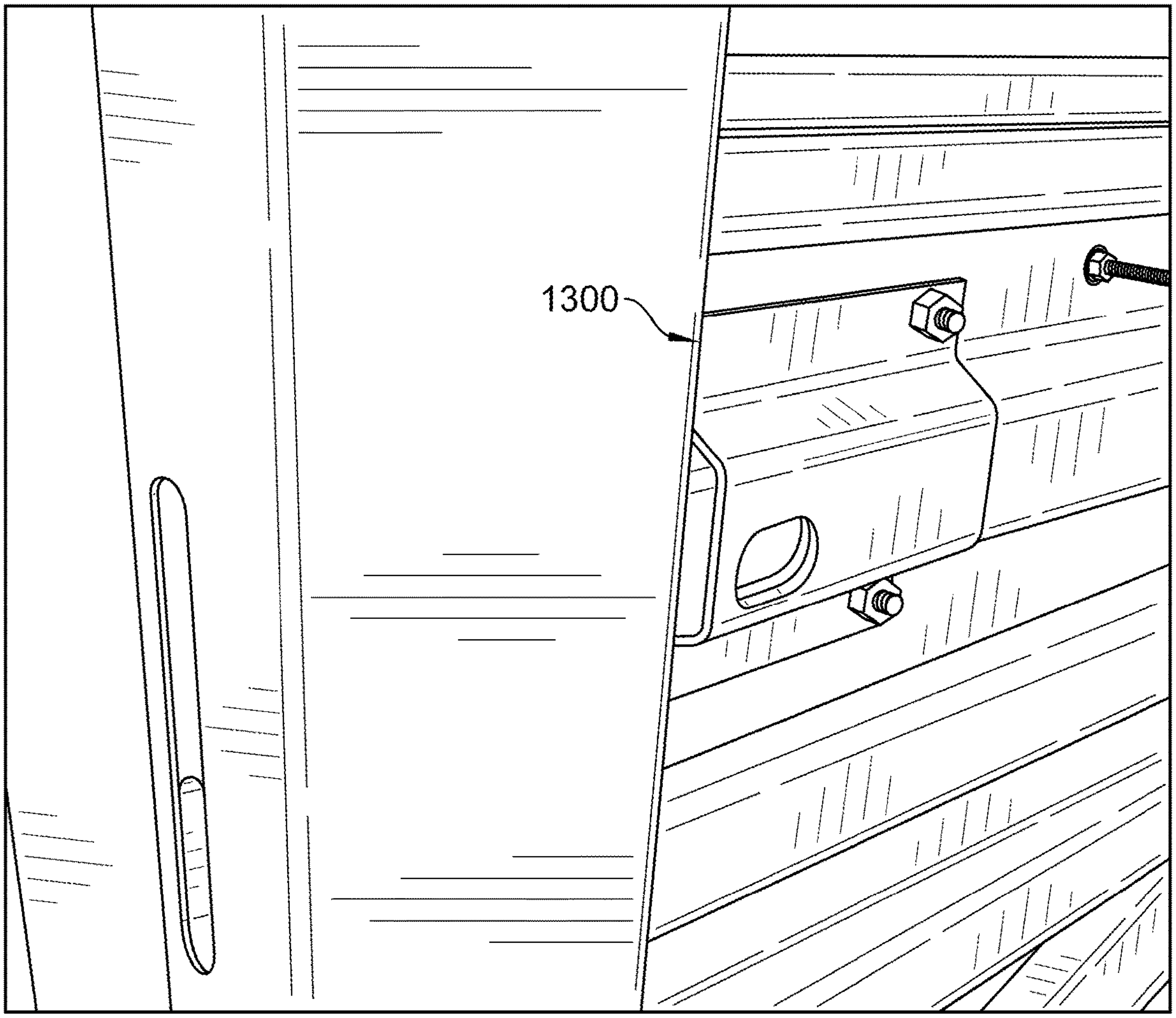
FIG. 13 is a perspective view of a door latch that may be used with the latch lock of FIG. 1, according to an embodiment.
Figure 15:
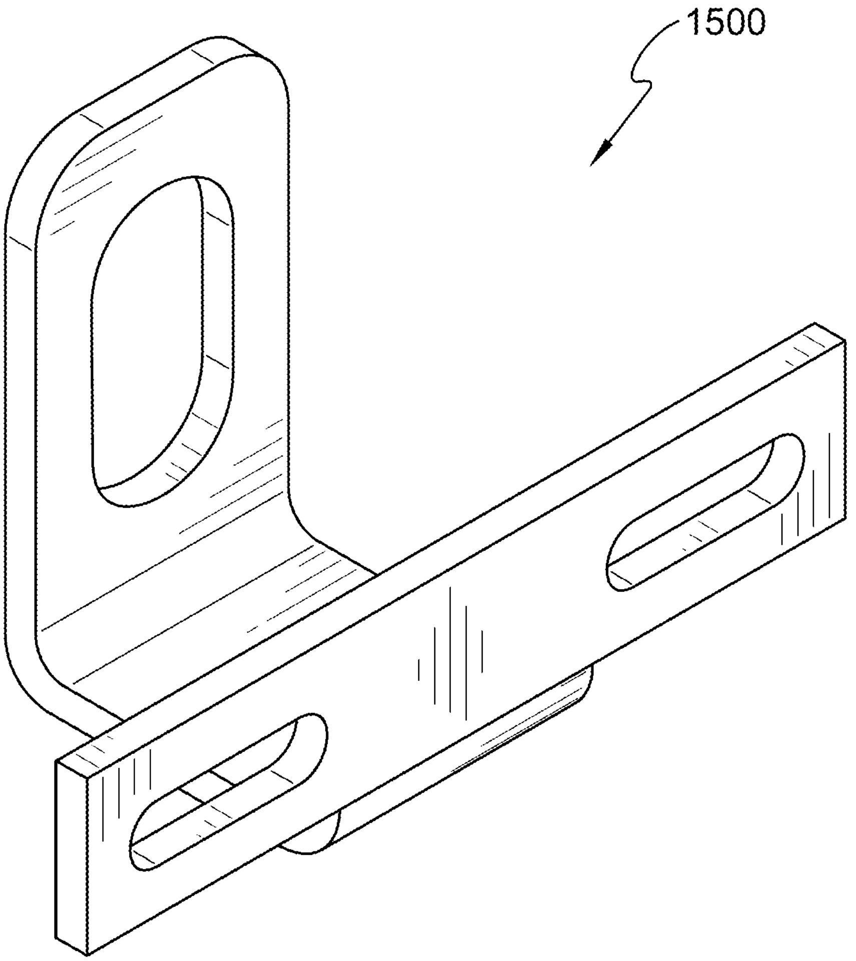
FIG. 15 is a perspective view of a latch that may be used with the latch lock mounted to the frame in the arrangement shown in FIG. 14, according to an embodiment.

At least a portion of the door latch 12 is fixed relative the frame 13 bordering the passageway to selectively engage with the latch lock 14 when the door is in the closed position. In some embodiments, the door latch 12 may include a mount (not shown) coupled to the door 11 in a fixed position and a movable shuttle (also not shown) coupled to the mount for movement between a locked position, where the movable shuttle is engaged with the latch lock 14, and an unlocked position, where the movable shuttle is separated from the latch lock so that the door is free to move between the closed and opened positions. One non-limiting example of a suitable door latch 12 that may be used in the door-lock system 10 is a JANUS® MINI LATCH™ manufactured by Janus International Group located at 135 Janus International Blvd., Temple, GA, 30179 as shown in FIG. 13. Another non-limiting example of a suitable door latch 12 that is fixed relative to the door or the frame with no moving parts and can be used with the door-lock system 10 is shown in FIG. 15 (as latch 1500).

Figure 10:
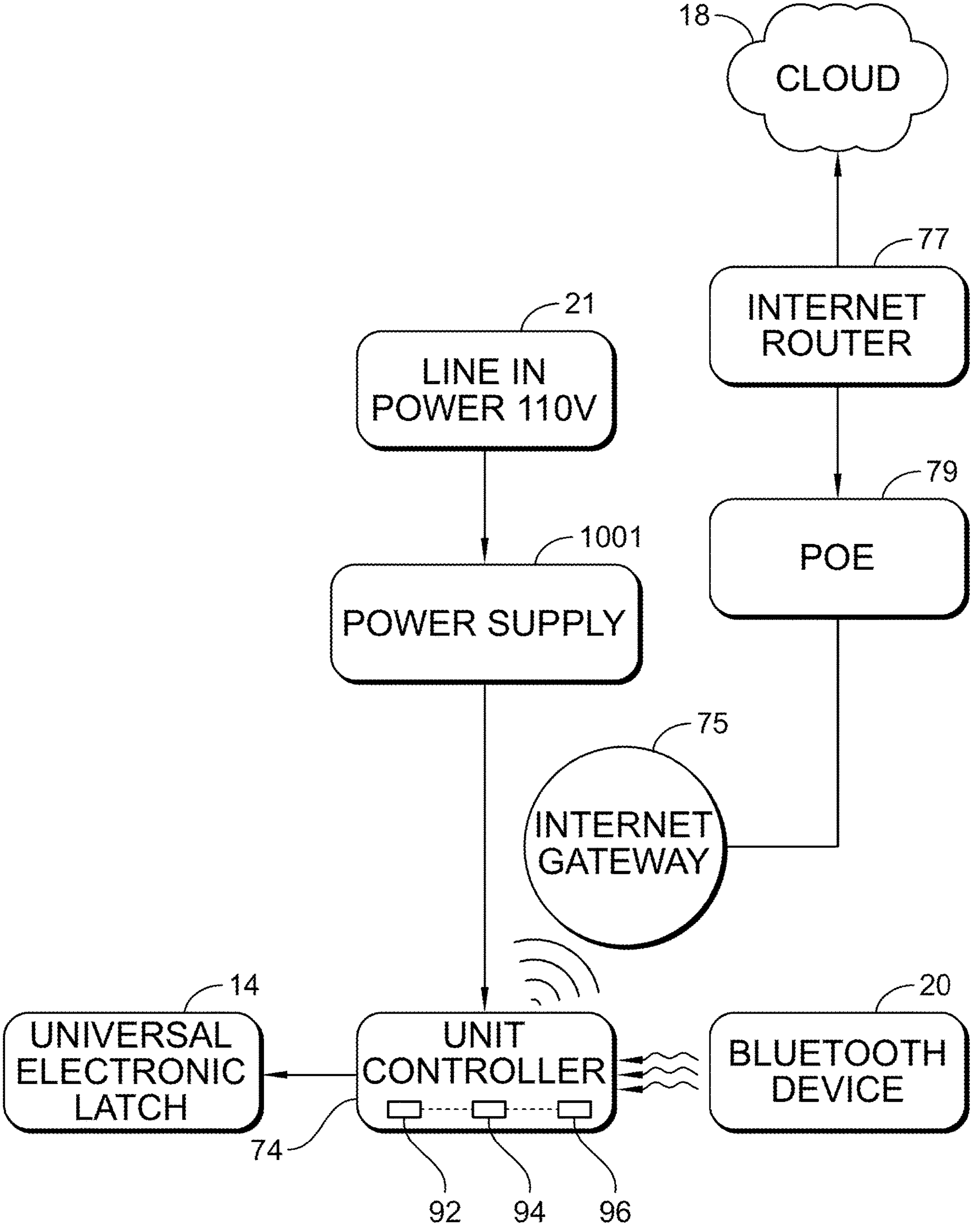
FIG. 10 is a diagrammatic view of a door-lock control system of the door-lock system of FIG. 1 receiving user inputs via a device and a network to selectively unlock the latch retainer of the latch lock, according to an embodiment.

The door-lock system 10 further includes a door-lock control system 16 arranged in communication with a network 18. A user may communicate with the door-lock system 10 via the network 18 using a device 20, such as a mobile device (e.g., a smartphone, tablet, a key fob, etc.), wearable device (e.g., a smartwatch, smart glasses, smart jewelry, etc.), and so on. Alternatively or additionally, the user may communicate directly with the door-lock control system 16 using the device 20. Communications with the network 18, and communications between the door-lock control system 16 and the device 20, are illustratively provided wirelessly via low power Bluetooth, but in some embodiments may include any suitable manner of wireless communications, including but without limitation, infrared, radio frequency, Wi-Fi, ZigBee, 3G/4G/5G, Ultra-wide-band, and the like. Accordingly, the door-lock control system 16 may include suitable communication circuitry such as one or more antennas and one or more transceivers to send and/or receive signals and data through the network 18 and/or the device 20. The door-lock control system 16 may be coupled to network 18 via a wired connection using a connector 19, illustratively a 4-pin connector 19 that is capable of transmitting data and/or power 21 to and from the latch lock 14 via a power supply 1001. In other embodiments, the latch lock 14 may include an on-board power system, such as a battery. The door-lock control system 16 is further described relative to FIG. 10.

Communication between door-lock control system 16 and device 20 can permit the user to disengage the latch lock 14 so that the door latch 12 may be separated from the latch lock 14 to unlock the door. A user in proximity with the door may access an application or menu via device 20 and provide user input 17 to operate the door-lock control system 16. Doing so causes the latch lock 14 to move to the disengaged configuration and release the door latch 12 for selective movement, thereby unlocking the door. Thereafter, the user may enter and/or confirm identifying information such as a unique identifier for a particular latch lock 14 and/or door desired to be accessed. User identification information may also be input (as the user inputs 17) into the device 20 to ensure authorization for operation of the particular door. Further, an owner of the door and the door-lock system 10 may remotely access the door-lock control system 16 via the remote network 18 to pre-program the door-lock control system 16.

Figure 2:
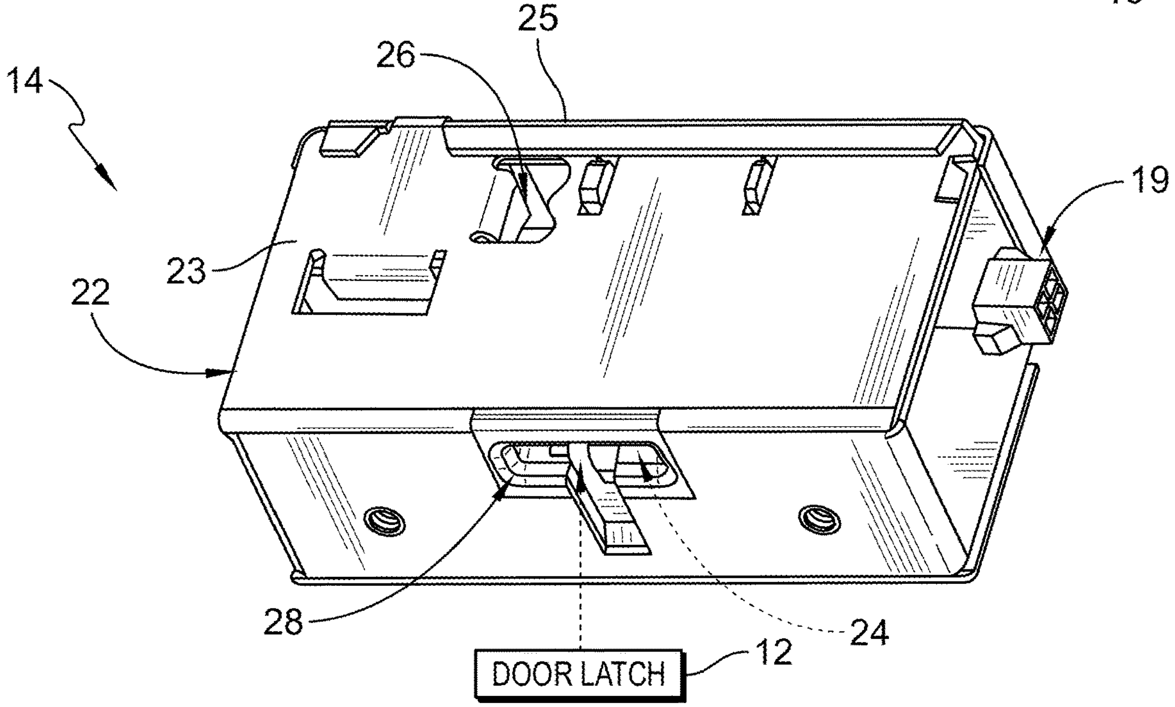
FIG. 2 is a perspective and diagrammatic view of the door-lock system of FIG. 1 showing a latch-guide slot that is configured to receive a door latch, according to an embodiment.
Figure 3:
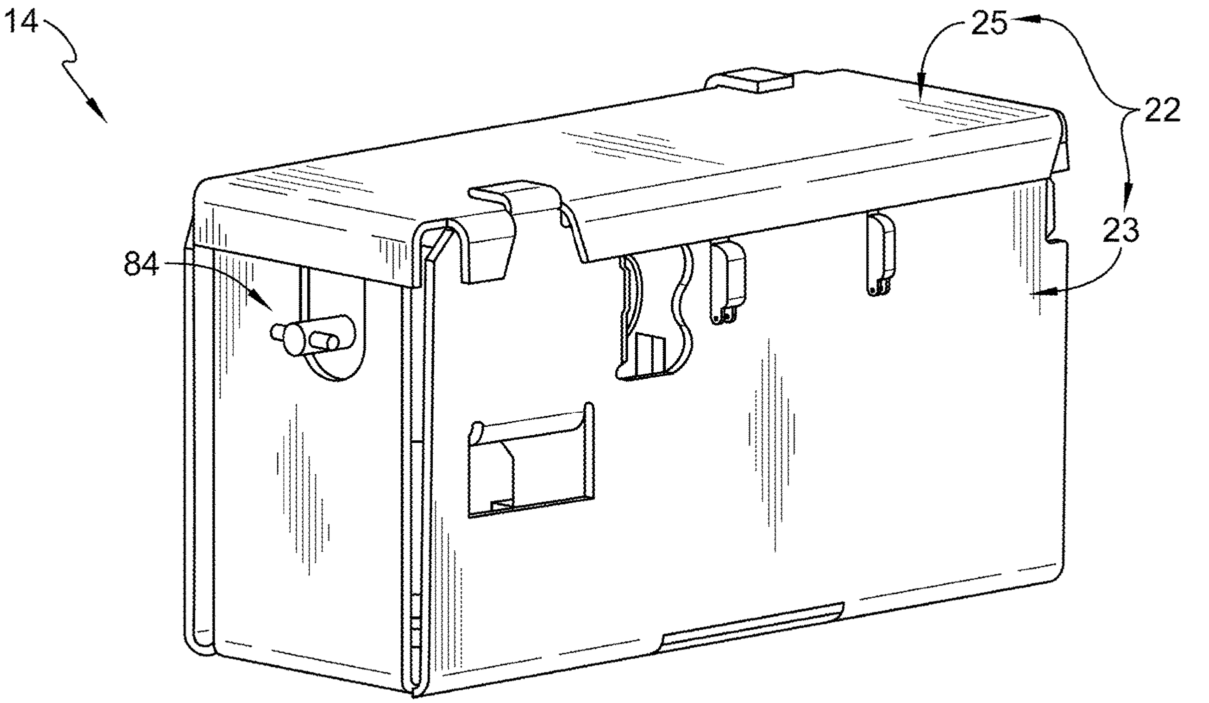
FIG. 3 is a perspective view of a latch lock of the door-lock system of FIG. 1, according to an embodiment.

The latch lock 14 is normally biased to the disengaged configuration and may be configured to automatically change to the engaged configuration when the door latch 12 is moved to the locked position in engagement with the latch lock 14. In an embodiment, the latch lock 14 may automatically change to the engaged configuration when the door moves from the opened position to the closed position. The latch lock 14 includes a lock housing 22 and a latch-retainer assembly 24 as shown in FIGS. 2 and 3. In an embodiment, the lock housing 22 is made from sheet metal that is bent into the shape of a prism and that has a relatively small footprint to fit within the frame 13 of the door 11. The lock housing 22 may include multiple pieces such as a main housing 23 and a back plate or cover 25, but in some embodiments the lock housing 22 may be formed as a one-piece component.

Further, the lock housing 22 defines an internal housing space 26 that is sized to receive the latch-retainer assembly 24, at least a portion of the door-lock control system 16, and other components included in the latch lock 14. The lock housing 22 is formed to include a latch-guide slot 28 that is sized to receive the door latch 12 when the door latch 12 is moved to the locked position as suggested in FIG. 2. The latch-retainer assembly 24 is configured to engage with the door latch 12 when inserted into the latch-guide slot 28 to selectively block removal of the door latch 12, thereby blocking the door 11 from moving to the opened position relative to the frame 13.

Figure 4:
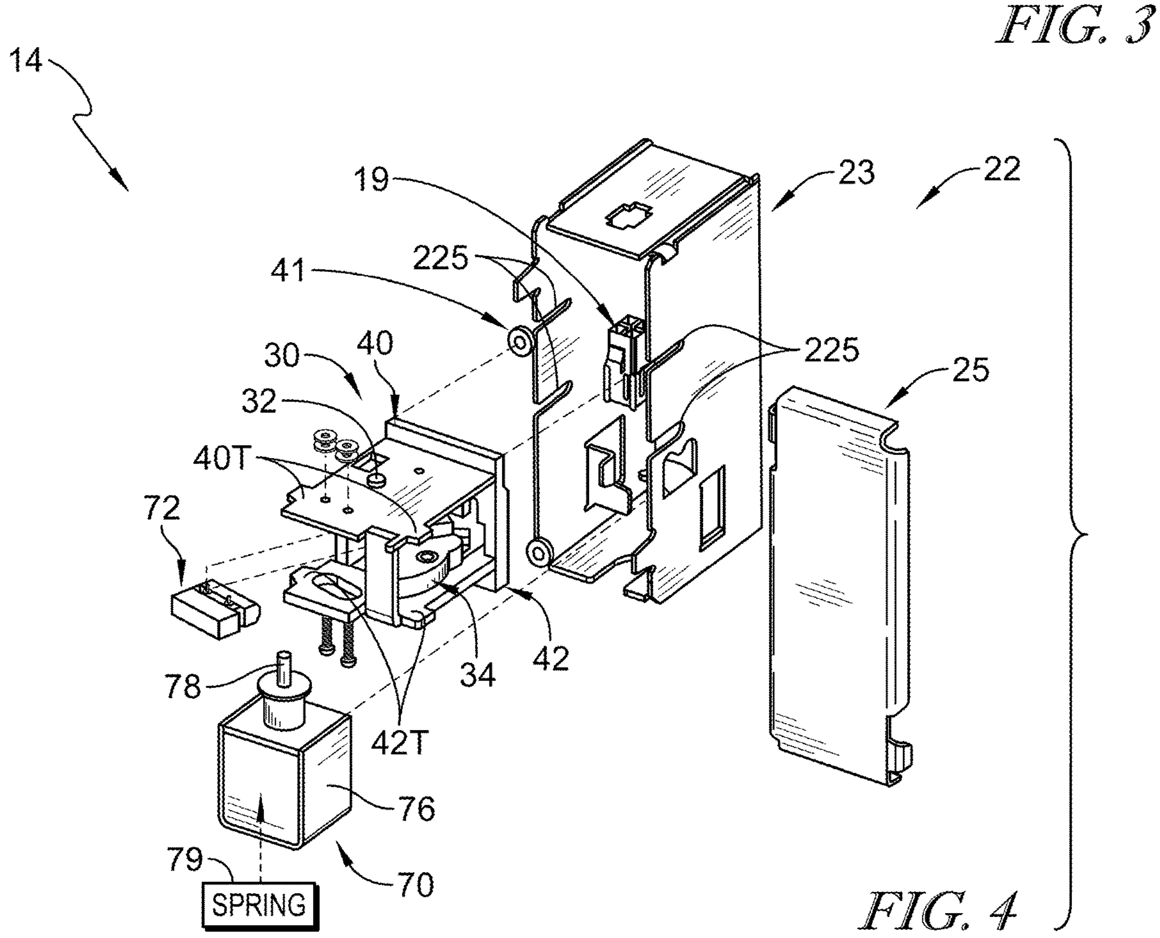
FIG. 4 is an exploded assembly view of the latch lock of the door-lock system of FIG. 1, according to an embodiment.
Figure 5:
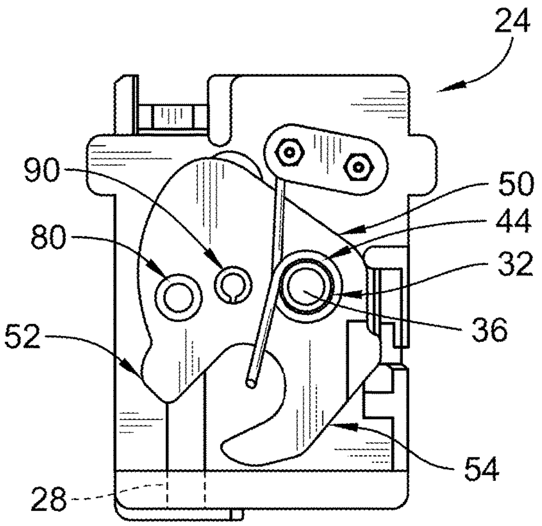
FIG. 5 is a top view of the latch lock with portions removed to show a latch retainer of the latch lock of FIG. 1, according to an embodiment.
Figure 6:
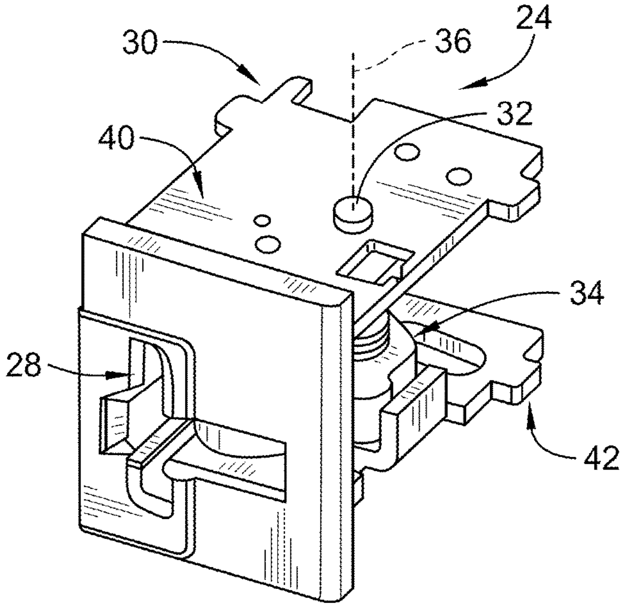
FIG. 6 is a perspective view of a latch-retainer assembly of the latch lock of FIG. 1, according to an embodiment.

The latch-retainer assembly 24 includes a latch-retainer mount 30 arranged to couple with the lock housing 22, latch-retainer shaft 32 coupled to the latch-retainer mount 30, and a latch retainer 34 coupled to the latch-retainer shaft 32 as shown in FIG. 4. The latch-retainer mount 30 supports the latch-retainer shaft 32 and the latch retainer 34 relative to the latch-guide slot 28 so that the door latch 12 can engage the latch retainer 34 in the locked position. The latch-retainer shaft 32 is configured to mount the latch retainer 34 to the latch-retainer mount 30 in a position where the latch retainer 34 is aligned with the latch-guide slot 28. One or more washers 35 may be provided between the latch retainer 34 and the latch-retainer mount 30 to decrease friction there between. The latch retainer 34 is configured to engage with the door latch 12 when the door latch 12 is in the locked position and/or when the door 11 is in the closed position to block the door latch 12 from moving to the unlocked position.

The latch-retainer mount 30 includes an upper mount plate 40 and a lower mount plate 42 spaced apart (e.g., using a shaft spacer 71) from the upper mount plate 40 as shown in FIG. 4. Each mount plate 40, 42 includes tabs 40T, 42T that slidingly fit within corresponding slots 22S formed in the lock housing 22 to secure the mount plates 40, 42 to the lock housing 22. In some embodiments, the mount plates 40, 42 may be secured to the lock housing 22 using another suitable structure such as one or more fasteners (e.g., attachment lugs 41), or a joining method such as welding, brazing, or soldering. In some embodiments, the latch-retainer shaft 32 may be attached directly to the lock housing 22 such that the latch-mount retainer 30 may be omitted.

The latch-retainer shaft 32 extends between the upper mount plate 40 and the lower mount plate 42 along a shaft axis 36 to support the latch-retainer shaft 32 within the interior space 26 defined by the lock housing 22 as shown in FIG. 4. The shaft axis 36 extends transversely to the latch-guide slot 28 and transversely to a direction of insertion of the door latch 12 into the latch-guide slot 28. The latch-retainer shaft 32 is illustratively embodied as a cylindrical rod to permit rotative movement of the latch retainer 34 relative to the latch-retainer shaft 32 and/or rotative movement of the latch-retainer shaft 32 and the latch retainer 34 relative to the latch-retainer mount 30.

Figure 9:
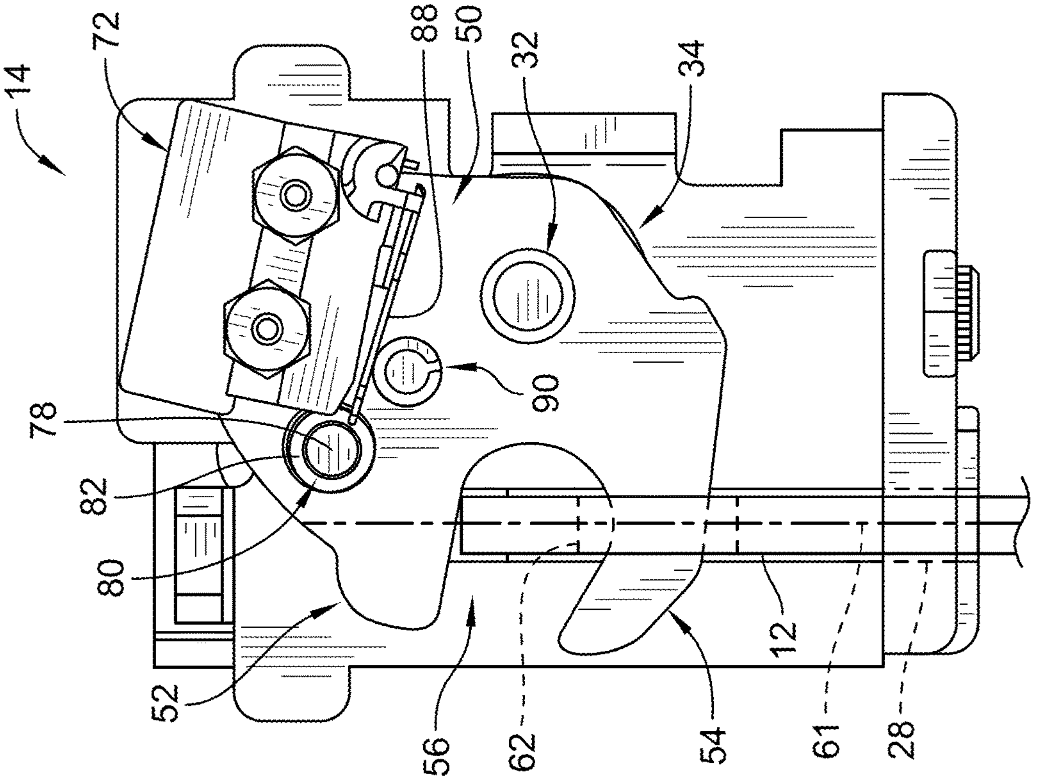
FIG. 9 is a top view of a latch lock with portions removed to show the latch retainer arranged in a restricted position blocking removal of the door latch from the latch lock, according to an embodiment.
Figure 8:
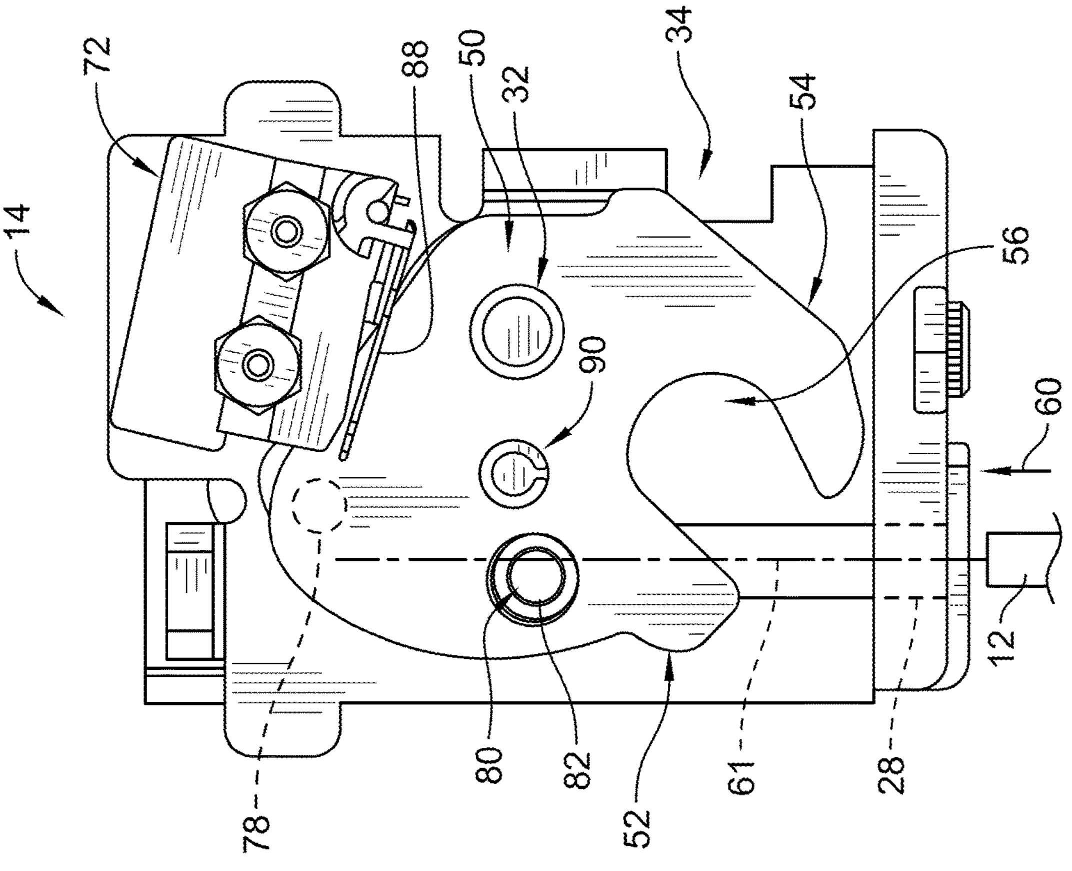
FIG. 8 is a top view of a latch lock with portions removed to show the latch retainer arranged in an unrestricted position, according to an embodiment.

The latch retainer 34 is coupled to the latch-retainer shaft 32 for pivotable movement about the shaft axis 36 between an unrestricted position and a restricted position as shown in FIGS. 8 and 9. In the unrestricted position, the latch retainer 34 is at least partially misaligned with the latch-guide slot 28 such that the door latch 12 is free to move from the unlocked position to the locked position. In the restricted position, the latch retainer 34 extends toward the door latch 12 is inserted in the latch-guide slot 28 in the locked position to block the door latch 12 from moving to the unlocked position. The latch retainer 34 is normally biased toward the unrestricted position by a biasing element 44. The biasing element 44 is illustratively embodied as a torsion spring 44 that is coiled around the latch-retainer shaft 32 and has a first arm 441 coupled with the latch-retainer mount 30 and a second arm 442 coupled with the latch retainer 34.

Figure 7:
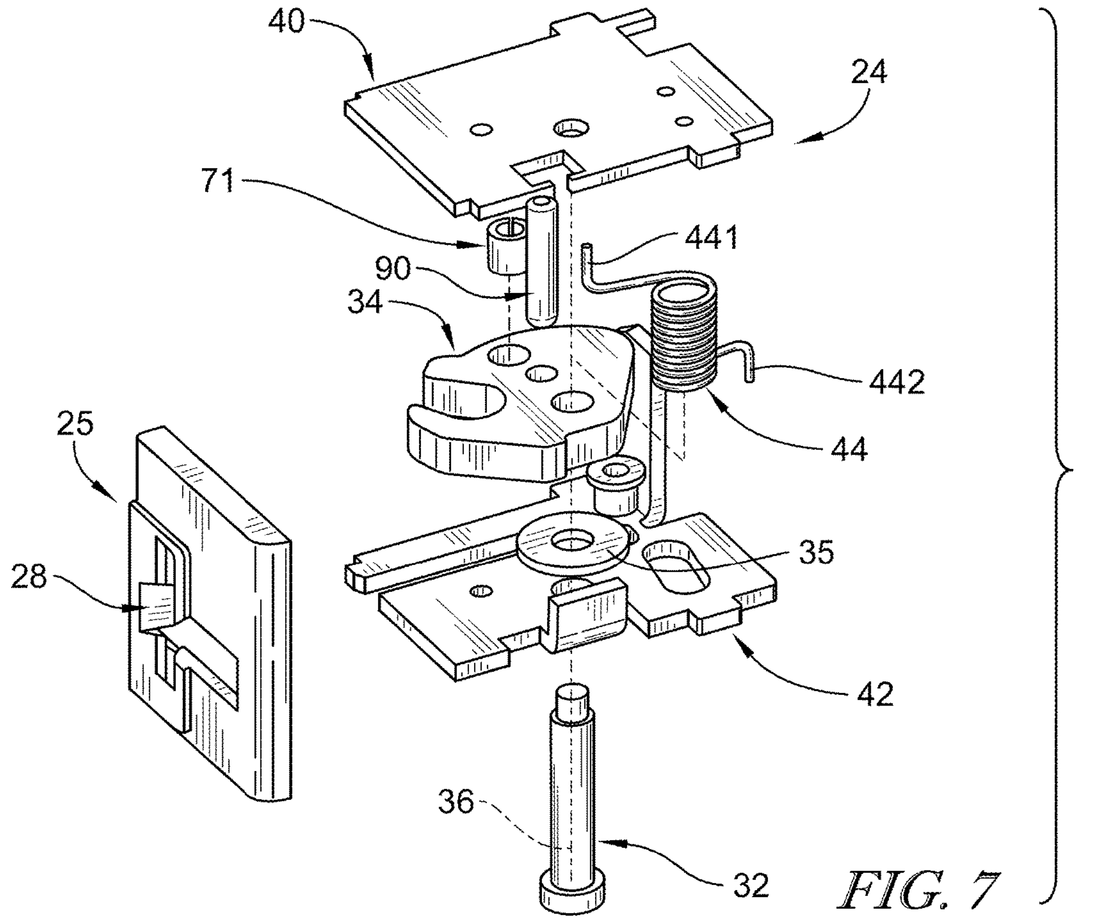
FIG. 7 is an exploded assembly view of the latch retainer assembly of FIG. 6, according to an embodiment.

The latch retainer 34 includes a retainer body 50, a motion lever 52, and a retainer arm 54 as shown in FIGS. 7-9. The retainer body 50 is coupled to the latch-retainer shaft 32. The motion lever 52 protrudes outwardly away from the retainer body 50 generally toward the latch-guide slot 28. The motion lever 52 may always be at least partially in line with the latch-guide slot 28 when the latch retainer 34 is in both the unrestricted position and the restricted position. The retainer arm 54 also protrudes outwardly from the retainer body 50 generally toward the latch-guide slot 28. The retainer arm 54 is misaligned with the latch-guide slot 28 when the latch retainer 34 is in the unrestricted position, but the retainer arm 54 is at least partially in line with the latch-guide slot 28 when the latch retainer 34 is in the restricted position. The motion lever 52 is spaced apart from the retainer arm 54 to define a U-shaped slot 56 therebetween.

In exemplary embodiments of operation, at least a portion of the door latch 12 may be moved from the unlocked position to the locked position by sliding the door latch 12 through the latch-guide slot 28 in an insertion direction 60 along a door-latch travel path 61 as suggested in FIG. 8. A distal tip of the door latch 12 is configured to contact the motion lever 52 as the door latch 12 moves along the door-latch travel path 61 toward the locked position. The door latch 12 drives the latch retainer 34 in rotation about the shaft axis 36 to automatically change the latch retainer 34 from the unrestricted position to the restricted position as the door latch 12 is moved from the unlocked position to the locked position. As the latch retainer 34 rotates about the shaft axis 36, the retainer arm 54 is simultaneously moved toward the door latch 12. The retainer arm 54 is configured to interlock with the door latch 12 to block removal of the door latch 12 from the latch-guide slot 28 when the latch retainer 34 reaches the restricted position as shown in FIG. 9. In the illustrative embodiment, the retainer arm 54 extends across the door-latch travel path 61 and passes through an aperture 62 formed in the door latch 12 to interlock with the door latch 12. In some embodiments, the door latch 12 may have a different shape or structure, such as one or more indents, tabs, or ridges, such that the retainer arm 54 interlocks with the door latch 12 in a different manner to block removal of the door latch 12 from the latch-guide slot 28.

The latch retainer 34 is selectively locked in the restricted position by the door-lock control system 16. The door-lock control system 16 includes a solenoid assembly 70, a status sensor 72, and a unit controller 74 as shown in FIGS. 4, 8, 9, and 10. The solenoid assembly is arranged to lie within the internal space 26 defined by the lock housing 22 and is at least partially spaced apart from the latch-retainer assembly 24. The status sensor 72 is coupled to the latch-retainer mount 30 to locate the status sensor 72 in proximity to the latch retainer 34. The controller 74 is communicatively coupled with the connector 19 and may communicate with the network 18 (or cloud 18) through an internet gateway 75 and an internet router 77 that are coupled via a power-over-Ethernet (PoE) connection 79. Other suitable connections between the controller 74 and the network 18 are also possible. The solenoid assembly 70 and the status sensor 72 are each communicatively coupled to the controller 74 to send and/or receive signals therebetween. In some embodiments, the controller 74 may be located on-board the latch lock 14 such as within the internal space 26.

The solenoid assembly 70 includes a solenoid housing 76 and a solenoid pin 78 that is biased outwardly by a spring 79 or another suitable biasing structure located within the solenoid housing 76. The solenoid pin 78 is biased into engagement with the retainer body 50 when the latch retainer 34 is in the unrestricted position. When the latch retainer 34 is moved from the unrestricted position to the restricted position, the solenoid pin 78 is biased upwardly through a pin-receiving slot 80 formed in the retainer body 50 upon arrival of the latch retainer 34 in the restricted position as shown in FIG. 9. The latch retainer 34 is retained in the restricted position by the solenoid pin 78 until the solenoid assembly 70 is electrically excited to withdraw the solenoid pin 78 from the pin-receiving slot 80. Once the solenoid pin 78 is removed from the pin-receiving slot 80, the biasing element 44 is configured to automatically return the latch retainer 34 to the unrestricted position so that the door latch 12 may be removed from the latch-guide slot 28 and the door 11 may be opened. The biasing element 44 may provide a biasing force on the latch retainer 34 sufficient force the door latch 12 out of the latch-guide slot 28 via the motion lever 52. In this way, the door latch 12 automatically returns to the unlocked position when the solenoid pin 78 is removed from the pin-receiving slot 80. The pin-receiving slot 80 formed in the retainer body 50 may be lined with a sheath 82.

Figure 12:
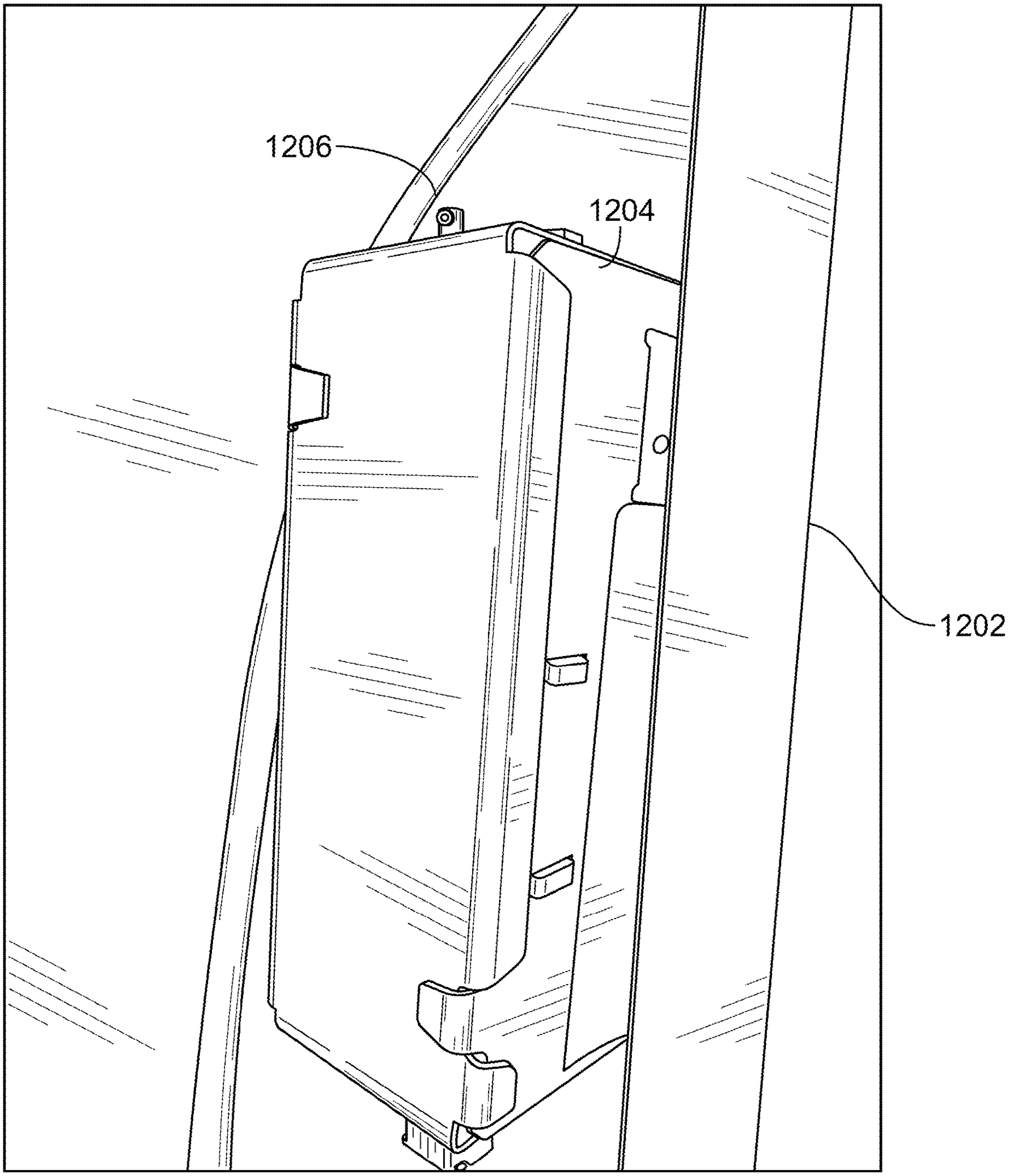
FIG. 12 is a perspective view of the latch lock located within the frame of the door and showing an emergency release, according to an embodiment.

In exemplary embodiments, the solenoid assembly 70 may further include an emergency pin-release 84 that allows users to manually remove the solenoid pin 78 from the pin-receiving slot 80. The emergency pin-release 84 may be used during a power failure event or another event where the solenoid assembly 70 is unable to be electrically excited to remove the solenoid pin 78 from the pin-receiving slot 80. The emergency pin-release 84 may be attached to an actuator 86 such as a strap or lanyard that is accessible from one side of the door 11 and is routed through the frame 13 of the door 11 to the emergency pin-release 84. In some embodiments, the door may be formed with an aperture or passageway that leads to the emergency pin-release and through which a tool may be inserted to operate the emergency pin-release 84. An example of this is shown in FIG. 12, in which a latch lock 1204 is mounted behind a door frame 1202. Illustratively, an emergency pin-release 1206 provides for manual release of the lock.

The status sensor 72 is configured to provide signals indicative of when the latch retainer 34 reaches the restricted position. The status sensor 72 is illustrative embodied as a micro-switch having a trigger 88 that, when compressed, sends a signal to the controller 74 to indicate that latch retainer 34 is in the restricted position. A status pin 90 is coupled to the retainer body 50 for movement therewith, between the unrestricted position and the restricted position. The status pin 90 is configured to engage and compress the trigger 88 of the status sensor 72 when the pin-receiving slot 80 reaches the solenoid pin 78. When the solenoid pin 78 is released from the pin-receiving slot 80 and the status pin 90 is disengaged from the trigger 88, the status sensor 72 may send a signal to the controller 74 indicating the latch retainer 34 is no longer in the restrictive position and the door latch 12 may be moved to the unlocked position. The signal may also indicate that the door latch 12 is already in the unlocked position and that the door 11 is free to open.

The controller 74 is configured to control operation of the solenoid assembly 70 to enable authorized users to unlock the latch lock 14 and pass through the doorway. The controller 74 includes a processor 92 for executing instructions and also includes a memory storage device 94 storing instructions to be executed by the processor 92. The processor 92 is configured to send commands and/or receive input via a communications circuitry 96. The processor 92 is illustratively embodied as a microprocessor, but in some embodiments, may include any suitable computing device and/or circuitry. The memory 94 is illustratively embodied as a flash memory, but in some embodiments, may include any suitable form of memory. The communications circuitry 96 is represented by a single element in FIG. 10, but represents any number of components suitable for wired and/or wireless communications via one or more communications protocols.

The controller 74 is illustratively arranged in communication with the network 18 via a wired or wireless connection. User inputs into device 20 are relayed over the network 18 to the controller 74. Upon receipt of an authorized input, the controller 74 is configured to send a command signal to the solenoid assembly 70 to cause the solenoid pin 78 to withdraw from the pin-receiving slot 80. The controller 74 may store one or more statuses of the latch lock 14 in the memory storage device based on signals from status sensor 72 or other sensors, for example, position sensors indicating to the controller 74 a position of any one or more of the door latch 12, latch retainer 34, or solenoid pin 78. The controller 74 may only send a command signal to the solenoid assembly 70 to withdraw the solenoid pin 78 in response to a signal from the status sensor 72 that indicates that the latch retainer 34 is in the restricted position.

Figure 14:
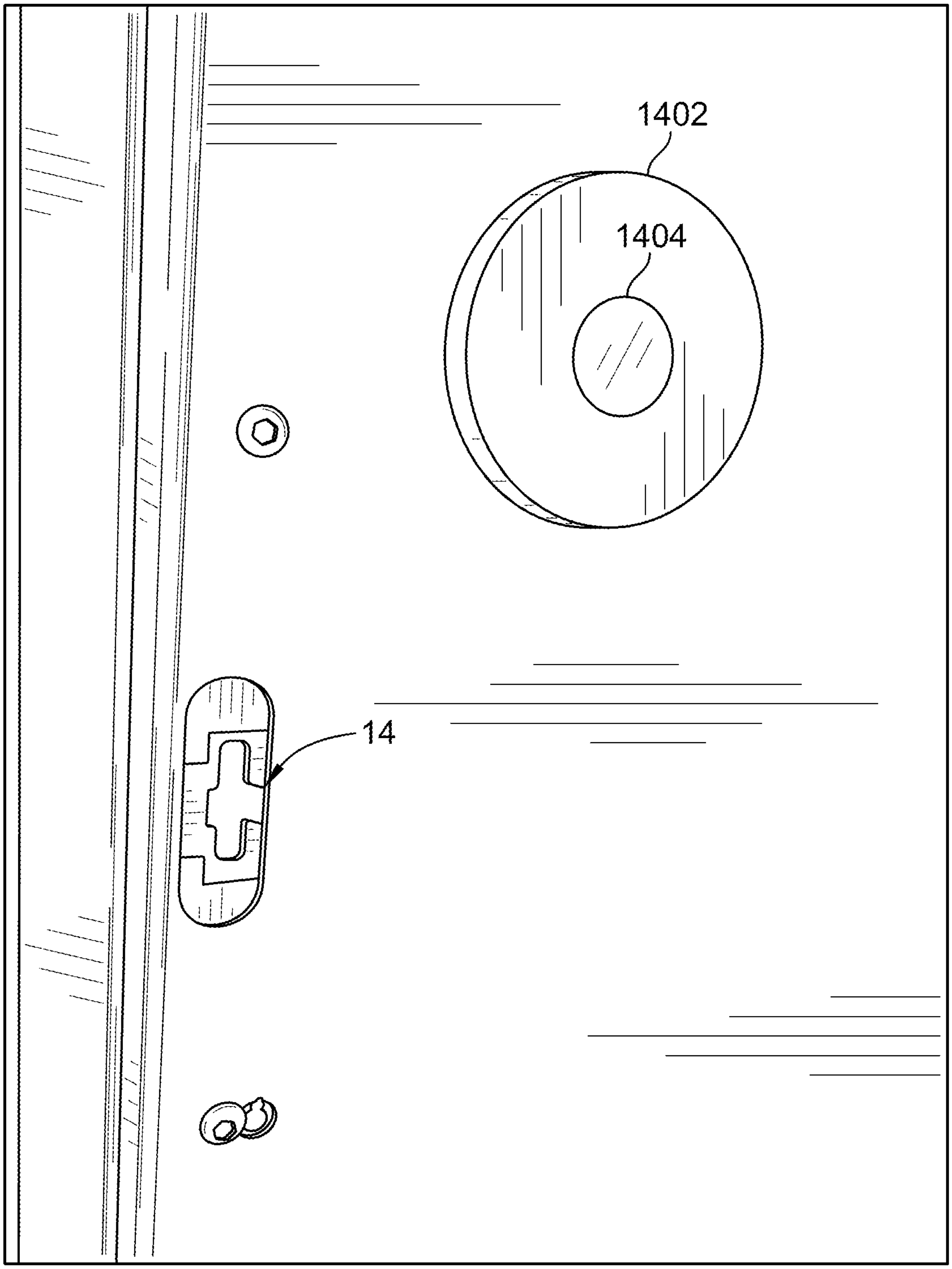
FIG. 14 is a perspective view of the latch lock mounted within a frame so that a guide slot is flush with an outward facing surface of the frame and an indicator light for providing an indication as to a status of the latch lock, according to an embodiment.

The user inputs 17 are illustratively provided to the controller 74 via a smart-device app (such as, but not limited to, via Bluetooth). As such, the memory storage device 94 may be programmed with identifying data so that only authorized users and their authorized device 20 may unlock the latch lock 14. In other embodiments, the user inputs 17 may be provided by a keypad, a wireless fob (such as, but not limited to, radio frequency), and/or quick-click code (such as, but not limited to, touch with a predetermined press pattern). The controller 74 may also be communicatively coupled to one or more visual or audible (also referred to herein as "audiovisual") indicators, such as the light status indicator 1402 of FIG. 14, to indicate to a user when the latch lock 14 is in the engaged and disengaged configurations and/or when the door latch 12 is in the locked or unlocked positions. In the example provided by FIG. 14, the indicator 1402 provides a portion 1404 that may be lit, for example, if the door latch 12 is in a locked position, or unlit if in an unlocked position. In other examples, the portion 1404 may use colors to indicate whether the door latch 12 is locked or unlocked.

Figure 11:
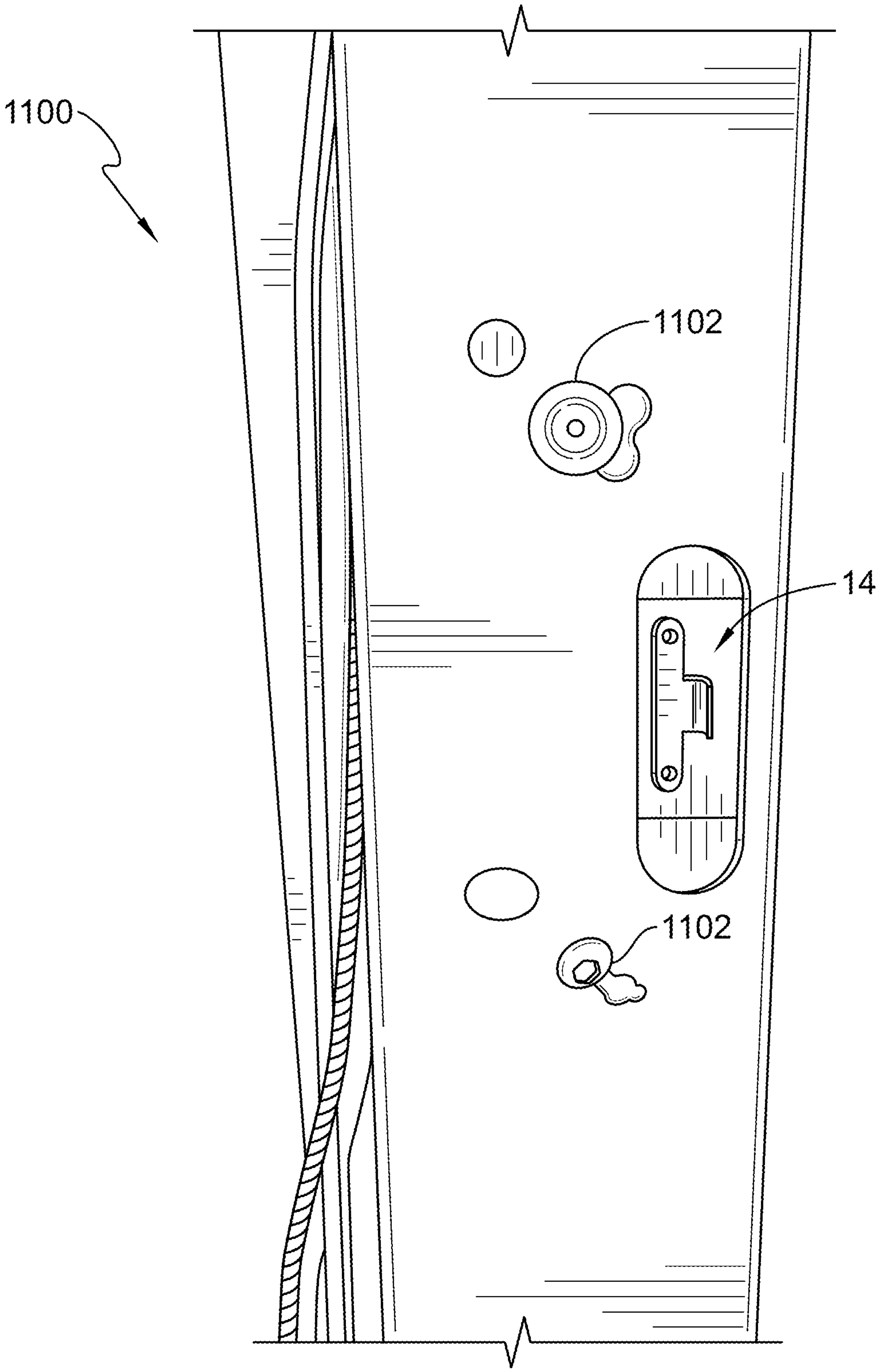
FIG. 11 is a perspective view of the latch lock arranged to lie within a frame of a door, according to an embodiment.

In certain embodiments, the latch lock 14 of the present disclosure provides contactless locking and unlocking of a door. Additionally, the door may be unlocked from a remote location (i.e., a location outside of a specified proximity of the door-lock control system 16), for example, by an owner or security personnel at the remote location when they are unable to be present at the door. The remote location can include another room within the premises, an area outside the premises, etc. The latch lock 14 also removes the need for a separate lock, such as a padlock, which may be broken or cut by an unauthorized person because these types of locks are typically visible and accessible from outside of the door. The latch lock 14 of the illustrative embodiment is integrated into the frame 13 or the door 11 where it is not visible and inaccessible when the door is closed thereby increasing security. An example of this is shown in FIG. 11, in which the latch lock 14 is mounted (using mounts 1102) inside the door frame. In some embodiments, the latch lock 14 of the present disclosure may be used with a latch to block other structures from opening such as, for example, a window, a container, or any other structure that is movable from a closed position to an opened position relative to another structure.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

What is claimed is:

1. A door-lock system, comprising:

a door latch coupled to a door or to a structure defining a passageway through which the door restricts passage;

a latch lock adapted coupled to the other of the door or to the structure defining the passageway, wherein the latch lock comprises:

a lock housing defining an interior housing chamber;

a latch-retainer shaft arranged within the interior housing chamber in a fixed position relative to the lock housing; and a latch retainer coupled to the latch-retainer shaft for pivotable movement about the latch-retainer shaft between a restricted position in which the latch retainer blocks removal of the door latch from the lock housing and an unrestricted position in which the door latch is free to retract away from the lock housing so that the door is free to move relative to the structure defining the passageway;

and, a door-lock control system arranged in communication with a network, the door-lock control system configured to engage or disengage the latch lock in response to one or more user inputs over the network, wherein the door-lock control system is further configured to engage the latch lock in the restricted position to retain the latch retainer in the restricted position and to selectively disengage latch retainer to allow the latch retainer to move to the unrestricted position, and wherein the door-lock control system comprises:

a solenoid assembly having a solenoid pin biased toward the lock latch;

a status sensor configured to sense when the latch retainer is in the restricted position and the unrestricted position; and a controller configured to control operation of the solenoid assembly.

2. The door-lock system of claim 1, wherein the controller is configured to receive signals from the status sensor indicative of whether the latch retainer is in the restricted position or the unrestricted position.

3. The door-lock system of claim 1, wherein the controller is configured to output a command signal to the solenoid assembly to withdraw the solenoid pin when the latch retainer is in the restricted position in response to the one or more user inputs authorizing the latch retainer to move from the restricted position to the unrestricted position.

4. The door-lock system of claim 1, wherein the solenoid assembly further comprises a pin-receiving slot in which the solenoid pin is inserted.

5. The door-lock system of claim 4, wherein the solenoid assembly further comprises an emergency-pin release coupled to the solenoid pin such that actuation of the emergency-pin release causes the solenoid pin to be manually removed from the pin-receiving slot.

6. The door-lock system of claim 4, wherein the solenoid assembly is configured to automatically return the door latch to the unlocked position upon removal of the solenoid pin from the pin-receiving slot.

7. The door-lock system of claim 1, wherein the controller comprises a microprocessor and a memory, the memory storing one or more statuses of the latch lock based on signals received from the status sensor.

8. The door-lock system of claim 1, wherein the controller is further configured to receive the one or more user inputs from an application executing on a mobile device.

9. The door-lock system of claim 1, wherein the controller is further configured to receive the one or more user inputs from a device in a remote location from the door-lock control system.

10. The door-lock system of claim 1, wherein the door-lock control system is further coupled with an indicator light configured to provide an indication of a status of the latch lock.

11. The door-lock system of claim 1, wherein the controller is further configured to receive the one or more user inputs from a keypad device.

12. A method for locking a door or other structure using a latch, a latch lock comprising a lock housing defining an interior housing chamber, a latch-retainer shaft arranged within the interior housing chamber in a fixed position relative to the lock housing, and a latch retainer coupled to the latch-retainer shaft for pivotable movement about the latch-retainer shaft between a restricted position in which the latch retainer blocks removal of the latch from the lock housing and an unrestricted position in which the latch is free to retract away from the lock housing so that the door is free to move relative to the other structure, and a door-lock control system comprising a solenoid assembly having a solenoid pin biased toward the lock latch, a status sensor configured to sense when the latch retainer is in the restricted position and the unrestricted position; and a controller configured to control operation of the solenoid assembly, the door-lock control system arranged in communication with a network, the door-lock control system configured to engage or disengage the latch lock in response to one or more user inputs over the network, the door-lock control system further configured to engage the latch lock in the restricted position to retain the latch retainer in the restricted position and to selectively disengage latch retainer to allow the latch retainer to move to the unrestricted position, the door-lock control system comprising a solenoid assembly having a solenoid pin biased toward the lock latch, a status sensor configured to sense when the latch retainer is in the restricted position and the unrestricted position, and a controller configured to control operation of the solenoid assembly, the method comprising:

moving the latch from an unlocked position to a locked position, in which the latch cooperates with the latch lock to block movement of one structure relative to another structure; and, changing at least a portion of the latch lock from the unrestricted position to the restricted position with the latch simultaneously with moving the latch from the unlocked position to the locked position, and sensing, by the door-lock control system in communication with at least the latch lock over a network, whether the latch lock is in the restricted position or the unrestricted position.

13. The method of claim 12, further comprising outputting, by the door-lock control system, a command signal to the latch lock when the latch lock is in the restricted position in response to a user input authorizing the latch lock to move from the restricted position to the unrestricted position.

14. The method of claim 13, further comprising biasing the latch to the unlocked position with the latch lock.

15. The method of claim 13, wherein the user input is received by the door-lock control system from an application executing on a mobile device.

16. The method of claim 13, wherein the user input is received by the door-lock control system from a remote location relative thereto.

17. The method of claim 13, wherein the user input is received by the door-lock control system from a keypad device.

18. The method of claim 12, further comprising outputting, by the door-lock control system, an audiovisual indicator of a status associated with the latch lock.

* * * * *